United States Patent
Kotagiri

(10) Patent No.: US 12,413,369 B2
(45) Date of Patent: Sep. 9, 2025

(54) WIRELESS COMMUNICATION DEVICE, RU SELECTION DEVICE, AND METHOD

(71) Applicant: NEC Corporation, Tokyo (JP)

(72) Inventor: Dheeraj Kotagiri, Tokyo (JP)

(73) Assignee: NEC CORPORATION, Tokyo (JP)

( * ) Notice: Subject to any disclaimer, the term of this patent is extended or adjusted under 35 U.S.C. 154(b) by 395 days.

(21) Appl. No.: 17/801,447

(22) PCT Filed: Feb. 27, 2020

(86) PCT No.: PCT/JP2020/008124
§ 371 (c)(1),
(2) Date: Aug. 22, 2022

(87) PCT Pub. No.: WO2021/171510
PCT Pub. Date: Sep. 2, 2021

(65) Prior Publication Data
US 2023/0114359 A1 Apr. 13, 2023

(51) Int. Cl.
*H04L 5/00* (2006.01)
*H04W 72/02* (2009.01)

(52) U.S. Cl.
CPC ........... *H04L 5/0058* (2013.01); *H04W 72/02* (2013.01)

(58) Field of Classification Search
CPC ... H04L 5/0058; H04L 5/0044; H04L 5/0053; H04W 72/02; H04W 72/0453; H04W 72/50; H04W 72/54; H04W 72/542; H04W 74/08; H04W 74/0808; H04W 74/0816; H04W 74/0825; H04W 84/12; Y02D 30/70
See application file for complete search history.

(56) References Cited

U.S. PATENT DOCUMENTS 9,743,393 B2    8/2017  Ghosh et al.
2018/0199375 A1*  7/2018  Nezou ................ H04W 74/006
(Continued)

FOREIGN PATENT DOCUMENTS

WO       2017/186587 A1    11/2017
WO    WO-2019108097 A1 *   6/2019

OTHER PUBLICATIONS

Wang et al., "Deep Reinforcement Learning for Dynamic Multi-channel Access in Wireless Networks", Jun. 2018, IEEE Transactions on Cognitive Communications and Networking, vol. 4, No. 2, pp. 257-265. (Year: 2018).*

(Continued)

*Primary Examiner* — Robert C Scheibel

(57) ABSTRACT

A data processing unit generates device state information based on carrier sensing data and acknowledgement signals received from an access point. A feature extraction and scoring unit extracts features from the device state information and generates scores for each RU representative of possibility of successful transmission based on the extracted features. A reward computation unit computes reward for providing feedback on prediction accuracy of the scores. A controller determines a RU used to transmit data based on the scores. The controller stores experiences including the device state information and the reward in a memory unit. The controller updates parameters of the feature extraction and scoring unit based on the experiences stored in the memory unit.

13 Claims, 20 Drawing Sheets

(56) References Cited

U.S. PATENT DOCUMENTS

2019/0053275 A1     2/2019   Lanante et al.
2019/0230046 A1     7/2019   Djukic et al.
2024/0046629 A1*    2/2024   Lee .................... G06V 10/751

OTHER PUBLICATIONS

Challita et al., "Proactive Resource Management in LTE-U Systems: A Deep Learning Perspective", 2017, arXiv:1702.07031v1, pp. 1-29. (Year: 2017).*
International Search Report for PCT Application No. PCT/JP2020/008124, mailed on Nov. 6, 2020.
O. Naparstek and K. Cohen, "Deep Multi-User Reinforcement Learning for Distributed Dynamic Spectrum Access," eprint arXiv:1704.02613, Apr. 2017, pp. 1-17.
Stephane Baron(Canon), Random RU selection process upon TF-R reception; IEEE Draft; 802.11-15/1047r0, Sep. 14, 2015, pp. 1-9.
Nikola Serafimovski(Purelifi), "TGbb MAC Channel Access features proposal", IEEE Draft; 802.11-19/0846r1, May 14, 2019, pp. 1-20.
JP Office Action for JP Application No. 2022-547783, mailed on Jul. 4, 2023 with English Translation.

* cited by examiner

WIRELESS COMMUNICATION DEVICE, RU SELECTION DEVICE, AND METHOD

This application is a National Stage Entry of PCT/JP2020/008124 filed on Feb. 27, 2020, the contents of all of which are incorporated herein by reference, in their entirety.

TECHNICAL FIELD

The present disclosure relates to a wireless communication device, a RU selection device, a method, and a computer readable medium.

BACKGROUND ART

Multi-User Orthogonal Frequency Division Multiple Access (MU OFDMA) is a medium access technique where a frequency spectrum is divided into narrower sub-channels. These sub-channels when quantized into fixed time duration are known as Resource Unit (RU). In the 802.11xx standards, OFDMA is used to improve communication efficiency for dense (large number of wireless communication devices) environments. Each wireless communication station randomly selects a sub-channel in every uplink communication cycle. However, random selection leads to high collision rate, thereby, degrading overall throughput.

Methods such as autonomous resource partitions and semi-distributed random access methods have been proposed to improve overall throughput. These methods have been disclosed in PTL 1 and NPL 1. Other approaches such as patterned resource allocation are disclosed in PTL 2. In PTL2, an additional group designation field is appended in PHY (physical layer) header. Each station transmits in pre-determined patterns (of RUs) based on group designation field values.

CITATION LIST

Patent Literature

PTL 1: United States Patent Publication Number US2019/0230046A1
PTL 2: United States Patent Number U.S. Pat. No. 9,743, 393B2

Non Patent Literature

NPL 1: O. Naparstek and K. Cohen, "Deep multi-user reinforcement learning for distributed dynamic spectrum access," eprint arXiv:1704.02613, April 2017.

SUMMARY OF INVENTION

Technical Problem

Notwithstanding the method disclosed in PTL 2, it modifies the 802.11 PHY header which may render wireless communication devices incapable of inter-operating with existing 802.11 devices fairly and efficiently. Further, in the presence of standard 802.11 devices, these methods cannot completely eliminate the low throughput problem.

The autonomous resource partition method in PTL 1 mitigates the low throughput problem by centrally allocating resources to each station. While this is effective, centralized allocation is not suitable for most WLAN applications due to dynamic number of users and load conditions.

The semi-distributed random medium access method in NPL 1 uses neural network based approach to select RUs. This method requires periodic data (neural network weights) to central server for learning the wireless environment, thereby adding additional overhead and network infrastructure requirements. Further, this method is not suitable for dynamic wireless networks where stations are mobile.

Accordingly, one of the objects of the present disclosure is to provide a wireless communication device, a RU selection device, a RU selection method, and a computer readable medium which can achieve high overall throughput in a wireless network where multiple stations can access medium simultaneously and in fully distributed fashion.

Solution to Problem

In order to achieve the above object, the present disclosure provides a wireless communication device. The wireless communication device includes:

a physical layer module configured to generate carrier sensing data indicating whether or not energy is detected in each resource unit, RU, used in wireless communication between the wireless communication device and an access point, and receive acknowledgement signals from the access point;

a RU selection module, configured to determine a RU used to transmit data from the wireless communication device to the access point; and a media access control layer module configured to transmit data using the RU determined by the RU selection module, wherein the RU selection module including:

a data processing unit configured to generate device state information based on the carrier sensing data and the acknowledgement signals obtained from the physical layer module;

a feature extraction and scoring unit configured to extract features from the device state information representative of interactions of a wireless communication station with other wireless communication stations, and generate scores for each RU representative of possibility of successful transmission based on the extracted features;

a reward computation unit configured to compute reward for providing feedback on prediction accuracy of the scores generated by the feature extraction and scoring unit;

a controller configured to determine the RU used to transmit data based on the scores generated by the feature extraction and scoring unit, store experiences including the device state information and the reward computed by the reward computation unit in a memory unit, and update parameters of the feature extraction and scoring unit based on the experiences stored in the memory unit.

Further, the present disclosure provides a resource unit, RU, selection device used in a wireless communication device. The RU selection device includes:

a data processing unit configured to generate device state information based on carrier sensing data indicating whether or not energy is detected in each RU used in wireless communication between the wireless communication device and an access point and acknowledgement signals received from the access point;

a feature extraction and scoring unit configured to extract features from the device state information representative of interactions of a wireless communication station with other wireless communication stations, and generate scores for each RU representative of possibility of successful transmission based on the extracted features;
a reward computation unit configured to compute reward for providing feedback on prediction accuracy of the scores generated by the feature extraction and scoring unit;
a controller configured to determine a RU used to transmit data based on the scores generated by the feature extraction and scoring unit, store experiences including the device state information and the reward computed by the reward computation unit in a memory unit and update parameters of the feature extraction and scoring unit based on the experiences stored in the memory unit.

Further, the present disclosure provides a resource unit, RU, selection method in a wireless communication device. The RU selection method includes:
generating device state information based on carrier sensing data indicating whether or not energy is detected in each RU used in wireless communication between the wireless communication device and an access point and acknowledgement signals received from the access point;
extracting features from the device state information representative of interactions of a wireless communication station with other wireless communication stations,
generating scores for each RU representative of possibility of successful transmission based on the extracted features;
computing reward for providing feedback on prediction accuracy of the scores; determining a RU used to transmit data based on the generated scores
storing experiences including the device state information and the reward in a memory unit; and
updating parameters used to extract the features and generate the scores based on the experiences stored in the memory unit.

The present disclosure provides a non-transitory computer readable medium having stored thereon a program to be executed by a processor. The program causing the processor to execute:
generating device state information based on carrier sensing data indicating whether or not energy is detected in each RU used in wireless communication between the wireless communication device and an access point and acknowledgement signals received from the access point;
extracting features from the device state information representative of interactions of a wireless communication station with other wireless communication stations,
generating scores for each RU representative of possibility of successful transmission based on the extracted features;
computing reward for providing feedback on prediction accuracy of the scores; determining a RU used to transmit data based on the generated scores
storing experiences including the device state information and the reward in a memory unit; and
updating parameters used to extract the features and generate the scores based on the experiences stored in the memory unit.

Advantageous Effects of Invention

A wireless communication device, a RU selection device, a RU selection method, and a computer readable medium according to the present disclosure can achieve high overall throughput in a wireless network where multiple stations can access medium simultaneously and in fully distributed fashion.

DESCRIPTION OF EMBODIMENTS

Hereinafter, exemplary embodiments of the present disclosure will be described in detail with reference to drawings.

Figure 1:
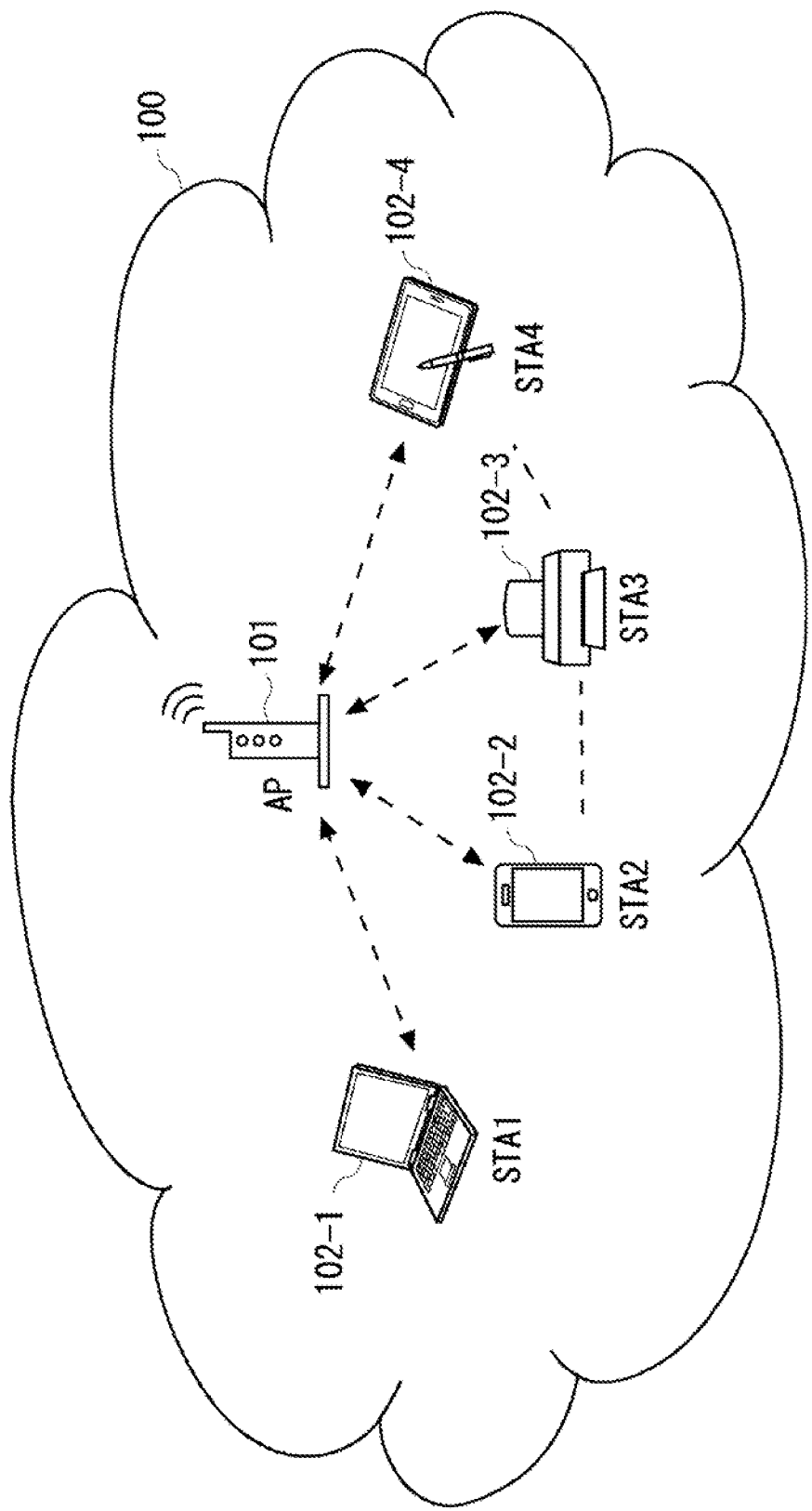
FIG. 1 is a block diagram schematically showing a wireless communication network.

FIG. 1 shows a wireless communication network according to an embodiment of the present disclosure. A wireless communication network 100 includes an access point (AP) 101 and a plurality of wireless communication stations (STAs) 102-1 to 102-n such as a personal computer, a smartphone, a printer, a portable digital device, and the like which include wireless communication functions. Note that the STAs 102-1 to 102-*n* may be collectively referred to as the STAs 102, if it is not necessary to distinguish them.

Figure 2:
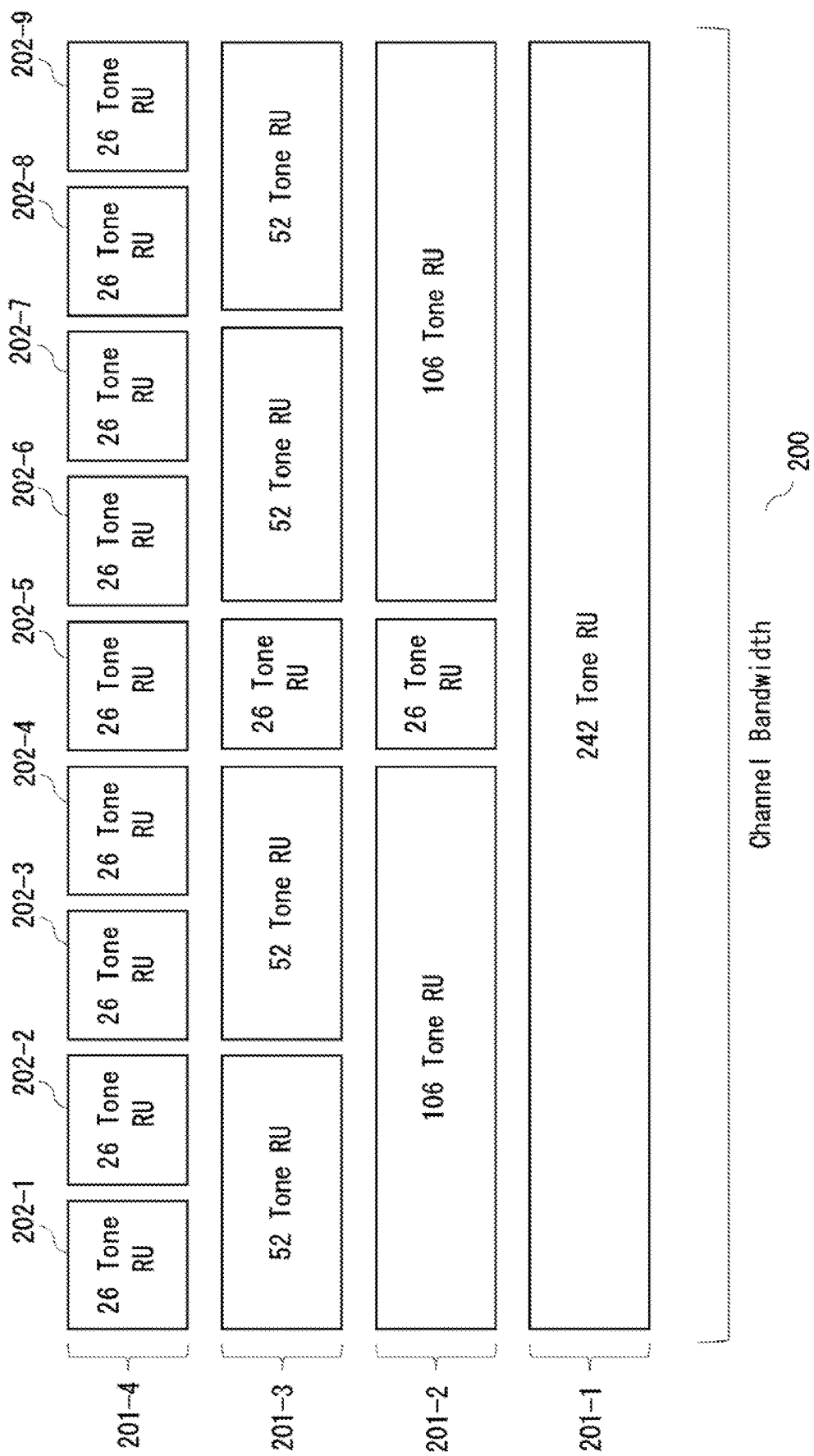
FIG. 2 is a diagram showing example channel bandwidth division into example resource unit distributions.

FIG. 2 shows an example of a channel bandwidth partitioned into Resource Units (RU). In FIG. 2, four different RU configuration 201-1 to 201-4 are illustrated as an example. As shown in FIG. 2, there are multiple ways in which a channel bandwidth 200 can be divided. The RU configuration is not particularly limited to those shown in FIG. 2. Other RU configurations may be implemented.

For the RU configuration 201-4, the channel bandwidth 200 is partitioned into 9 RUs 202-1 to 202-9. Note that the RUs 202-1 to 202-9 may be collectively referred to as the RUs 202, if it is not necessary to distinguish them. In the present embodiment, the channel bandwidth and its RU configuration are determined by the AP 101. The AP 101 can use any known algorithm to determine the RU configuration. The STA 102 does not concern itself on how the RU configuration selection is performed by the AP 101.

Figure 3:
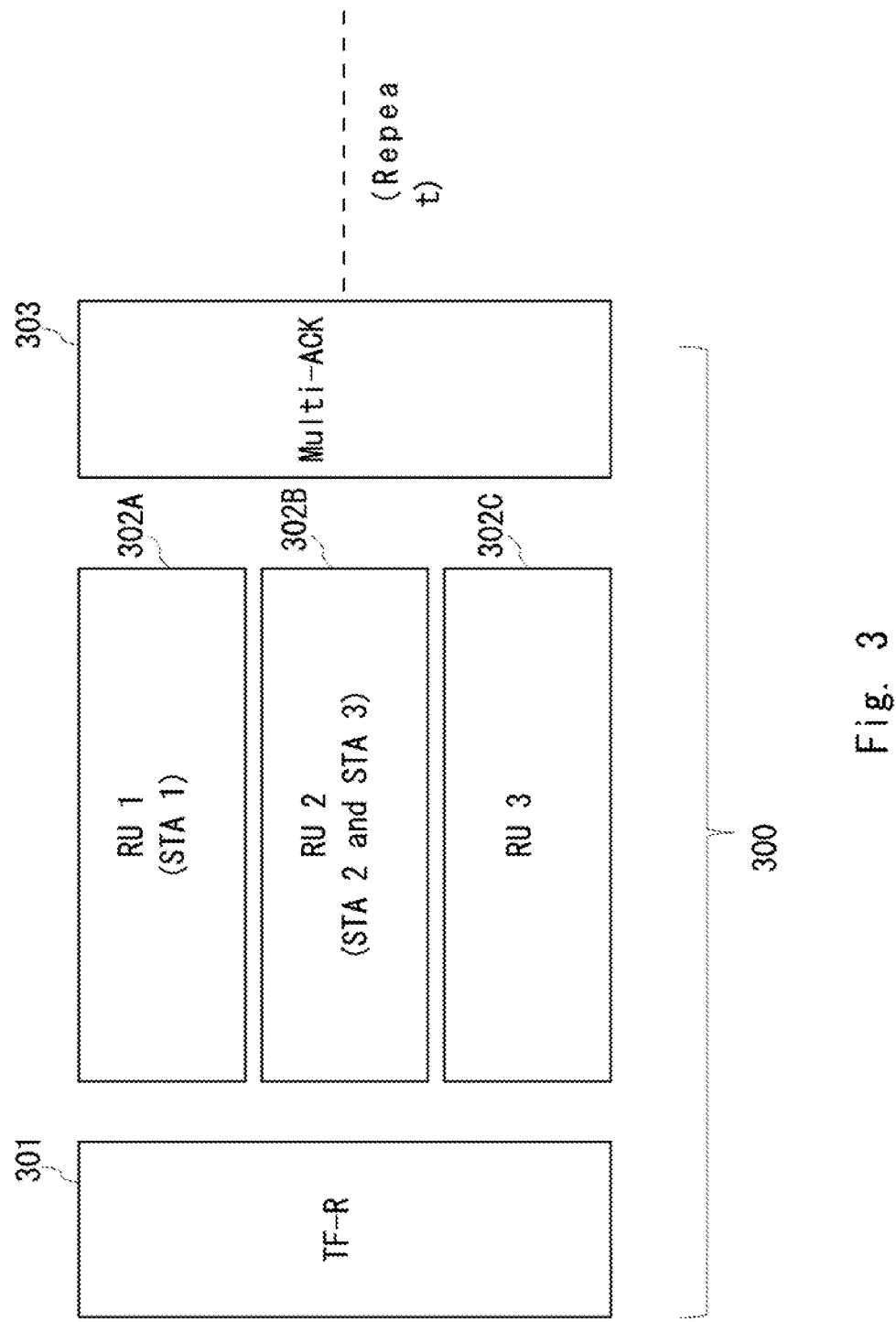
FIG. 3 is a timing diagram illustrating an example operation using trigger frames to initiate multi-user uplink communication by one or more wireless communication devices.

FIG. 3 shows an example of a sequence for initiating multi-user uplink communication. A sequence 300 includes a Trigger Frame (TF-R), RUs 302A to 302C, and a Multi-ACK (acknowledgement) packet 303. The MU-OFDMA communication is initiated by the AP 101 by transmitting the TF-R 301 as shown in FIG. 3. The TF-R 301 contains information related to available RUs, their configuration and total frame duration.

Each STA 102 selects a RU in which it transmits data using a distributed method explained later. If a RU is selected by a single STA, it is to be said success. If a RU is selected by two or more STAs, it is said to be collision. If a RU is not selected by any STA, it is said to be idle. In FIG. 3, it is assumed that the STA 102-1 (STA1) selects the RU 302A (RU1), and the STAs 102-2 and 102-3 (STA2 and STA3) select the RU 302B (RU2). The RU 303C (RU3) is not selected by the STA. In this case, the RU 302A is said to be success, the RU 302B is said to be collision, and the RU 302C is said to be idle.

The transmission by STAs is followed by a Multi-ACK packet 303 transmitted by AP 101. The Multi-ACK packet 303 indicates success or failure (due to collision or any other reason) in each RU. Hereafter, packet transmission failure due to collision or any other reason such as low SNR (Signal to Noise Ratio) or multi-path effects will be treated identically. The entire sequence 300 is repeated in succession.

Figure 4A:
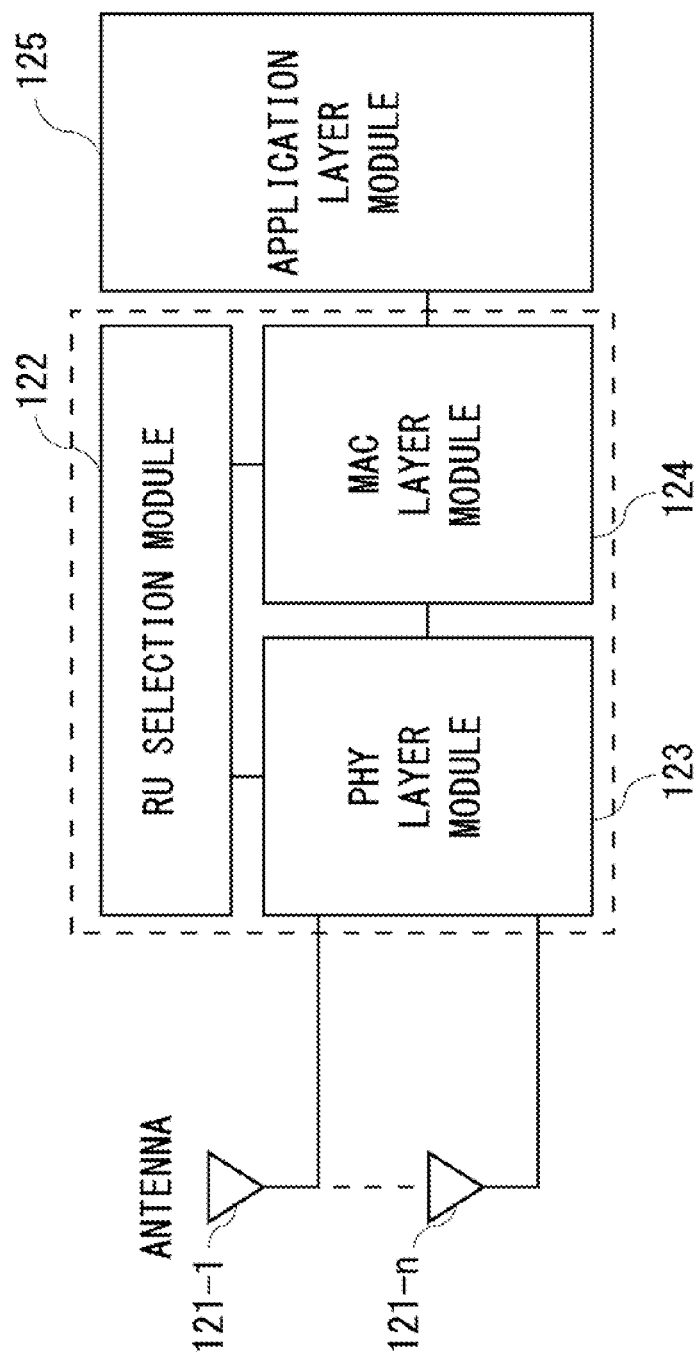
FIG. 4A is a block diagram showing a wireless communication device according to an embodiment of the present disclosure.

FIG. 4A shows an example schematic structure of the STA 102. The STA 102 includes an array of antennas 121-1 to 121-*n*, a RU selection module 122, an 802.11 based PHY layer module 123 and MAC layer module 124, and an application layer module 125. The application layer module 125 sends data to the MAC layer module 124 during packet transmission. The application layer module 125 receives data from the MAC layer module 124 during packet reception. Note that each arrow indicated in the subsequent block diagrams represent an example of a flow of a signal, but it is not intended that the flow of the signal is limited in a specific direction.

The PHY layer module 123 transmits data to the AP 101 (refer to FIG. 1) via one or more antenna 121. The PHY layer module 123 generates carrier sensing data indicating whether or not energy is detected in each RU. The carrier sensing data indicates result of independent energy detection in each of available RU. The carrier sensing data includes, for example, energy detection values in each available RU.

The PHY layer module 123 receives the TF-R 301 and the Multi-ACK packet 303 (refer to FIG. 3). The Multi-ACK packet includes ACK signal data. The ACK signal data includes success or failed transmission by any STA in wireless network in each available RU. In the case of FIG. 3, the ACK signal data includes information indicating that transmission in the RU1 is success. The PHY layer module 123 outputs the carrier sensing data and ACK signal data to the RU selection module 122.

The MAC layer module 124 manages, amongst other things, the wireless medium access. More specifically, the MAC layer module 124 controls the wireless medium access when to transmit data based on inputs from the PHY layer module 123 and the application layer module 125. The MAC layer module 124 send an interrupt signal to the RU selection module 122 when it decides to send data. The MAC layer module 124 receives back the index of a RU in which the STA should transmit data from the RU selection module. The MAC layer module 124 transmits data using the RU indicated by the index of the RU received from the RU selection module.

Figure 4B:
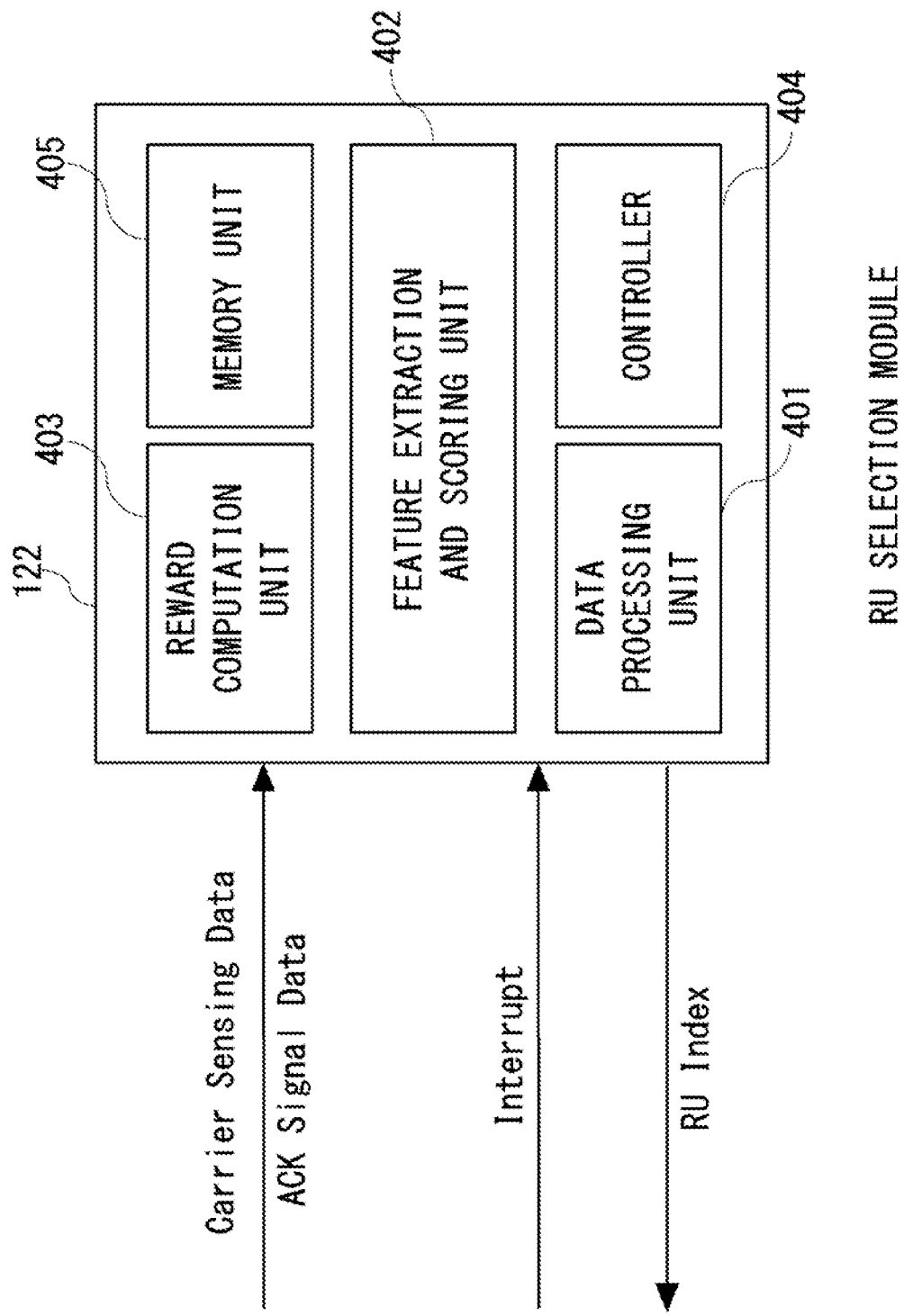
FIG. 4B is a bloc diagram showing components of a RU selection unit according to an embodiment of the present disclosure.

FIG. 4B shows an example of components of the RU selection module 122. The RU selection module 122 includes a data processing unit 401, a feature extraction and scoring unit 402, a reward computation unit 403, a controller 404, and a memory unit 405. The data processing unit 401 processes the carrier sensing data and the ACK signal data to generate device state information. The feature extraction and scoring unit 402 extracts features and patterns from the device state information and scores or rates each RU for the possibility of successful transmission.

The reward computation unit 403 computes reward for providing feedback on prediction accuracy of the scores generated by the feature extraction and scoring unit 402. The reward computation unit 403 provides feedback to the feature extraction and scoring unit 402 based on changes in device state information. The reward computation unit computes reward representative of the performance of the feature extraction and scoring unit 402.

The memory unit 405 stores past experiences including the device state information and actions of the device. Here, actions of the device refer to the index of the RU in which the STA 102 transmitted data. For example, if the STA 102 transmits data in the RU3 then the action of the device is said to be 3. The memory unit 405 may store ensemble of the device state information, an index of RU in which packet is transmitted, updated device state information post packet transmission and the reward as experience. The memory unit 405 may be a fixed size buffer. When the memory unit (buffer) reaches its capacity, the oldest experience is deleted to accommodate the new experience.

The controller (central controller) 404 manages different operations of the RU selection module 122. The controller 404 determines a RU used to transmit data based on the scores generated by the feature extraction and scoring unit 402. The controller 404 updates parameters of the feature extraction and scoring unit 402 based on the experiences stored in the memory unit 405.

Operations of the RU selection module 122 are divided into 3 phases:
1. RU selection phase
2. Experience storage phase
3. Update phase The operations of each phase are subsequently described.

In the present embodiment, each STA decides when to transmit data according to the standard IEEE (Institute of Electrical and Electronics Engineers) OFDMA based CSMA/CA (Carrier Sense Multiple Access/Collision Avoidance) protocol. The RU selection module 122 determines, in the RU selection phase, the index of the RU in which the STA should send data. An object of the present disclosure is to decide which RU to transmit data while not modifying any time related aspects of the standard IEEE 802.11 OFDMA based CSMA/CA protocol.

Figure 5:
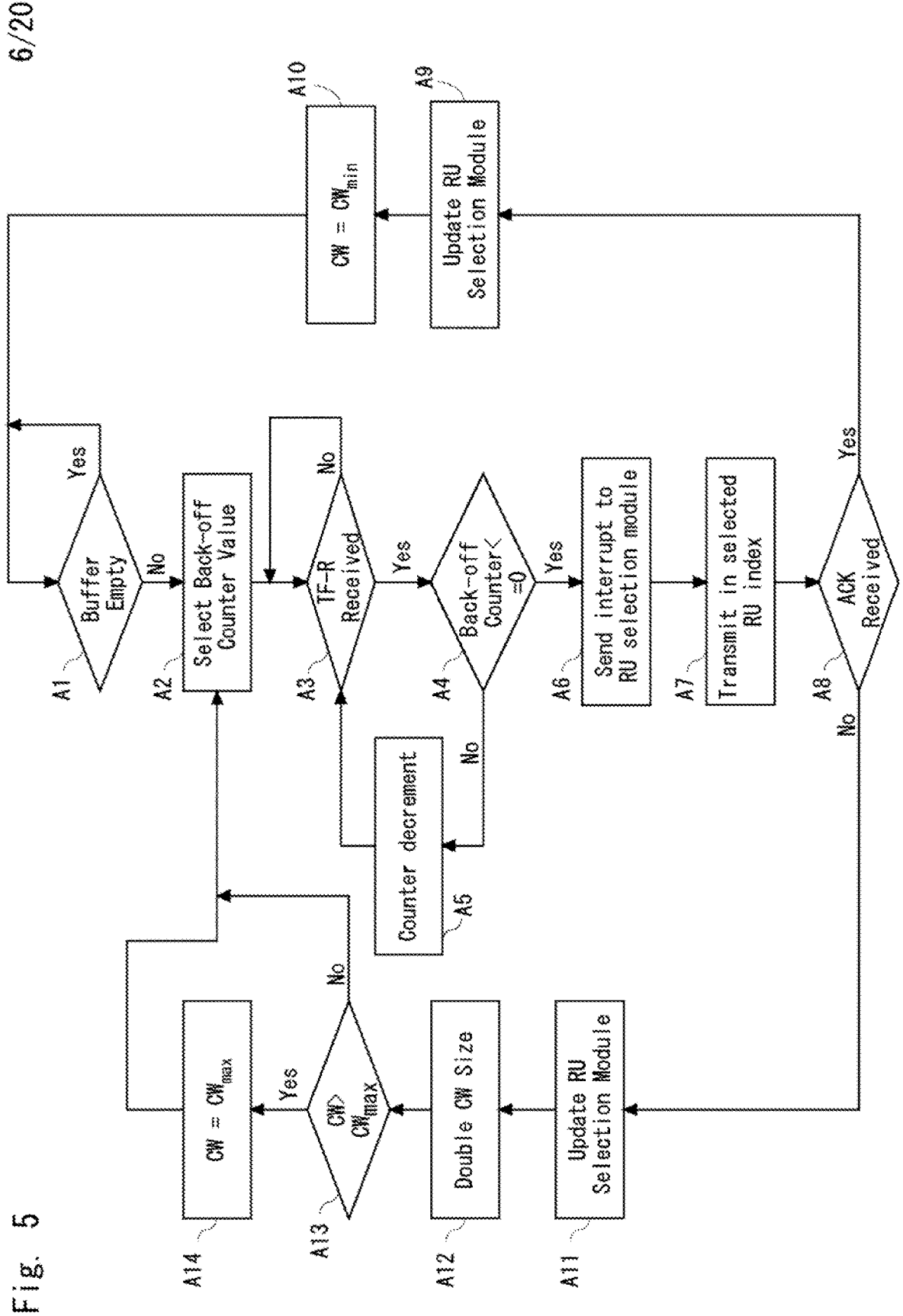
FIG. 5 is a flowchart showing medium access and resource unit selection method by wireless communication devices.

FIG. 5 shows the medium access and RU selection method. The MAC layer module 124 first checks if its send buffer is empty or not (Step A1). If the send buffer is not empty, the MAC layer module 124 randomly selects a back-off value from its contention window (CW) (Step A2). The MAC layer module 124 continuously checks for the TF-R frame (Step A3). On receiving the TF-R frame from the PHY layer module 123, the MAC layer module 124 checks if its back-off value is less than or equal to zero (Step A4). If back-off counter value is greater than zero, the MAC layer module 124 decrements the back-off counter by the number of available RUs (Step A5). The available RUs are indicated by the received TF-R frame.

When the back-off counter reaches zero or lower value, the MAC layer module sends an interrupt to the RU selection module 122 (Step A6). The RU selection module 122 determines an index of the RU in which the data packet is transmitted by the STA 102. The MAC layer module receives the index of the RU (RU index) from the RU selection module 122. The operations of the RU selection module 122 are explained later. The packet is transmitted from the STA 102 to the AP 101 in a RU indicated by the RU index (Step A7).

Next, the PHY layer module 123 checks for the ACK signal received from the AP for the transmitted packet (Step A8). If the PHY layer module 123 receives the ACK signal, the RU selection module 122 is updated (Step A9). Then, the MAC layer module 124 resets the contention window size to $CW_{min}$ (Step A10). Afterward, the operation is back to Step A1.

If the PHY layer module 123 does not receive the ACK signal, the RU selection module 122 is updated (Step A11) and then the MAC layer module 124 doubles the size of the contention window (Step A12). The MAC layer module 124 checks if the contention window size is larger than the maximum value $CW_{max}$ (Step A13). When it is determined that the contention window is larger than $CW_{max}$, the MAC layer module set the size of the contention window to $CW_{max}$ (Step A14). Afterward, the operation is back to Step A1. When it is determined that the contention window is not larger than $CW_{max}$ at Step A13, the operation is back to Step A1.

Figure 6A:
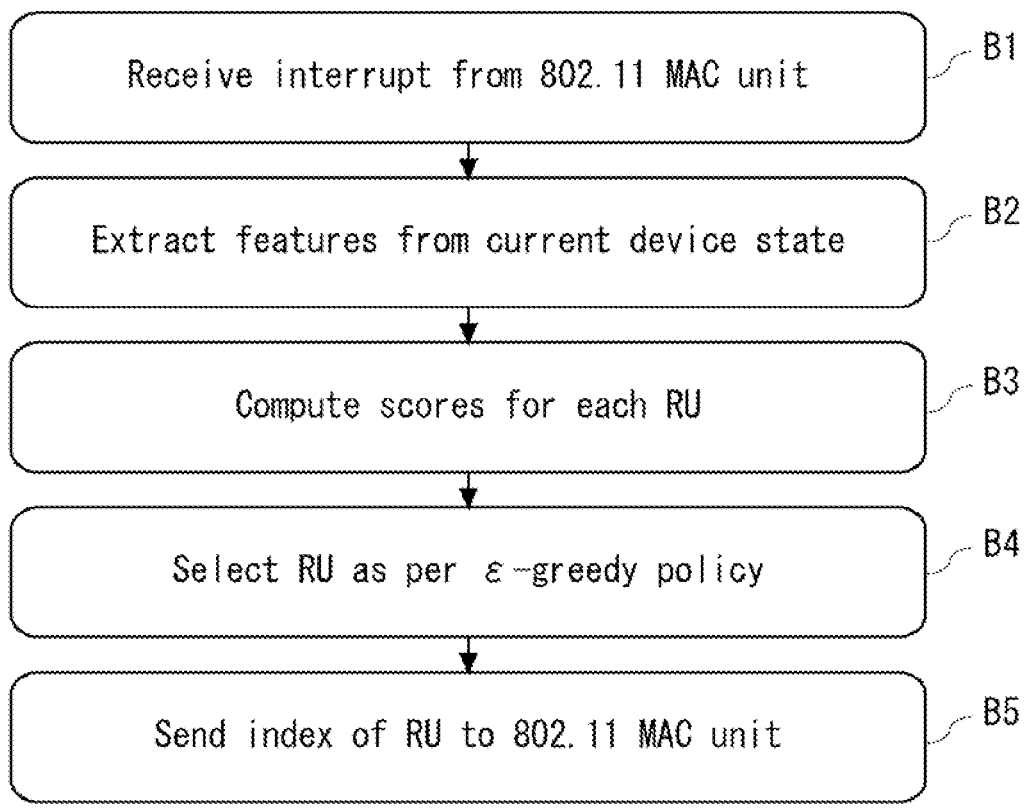
FIG. 6A is a flow chart showing the operation of the RU selection phase.
Figure 6B:
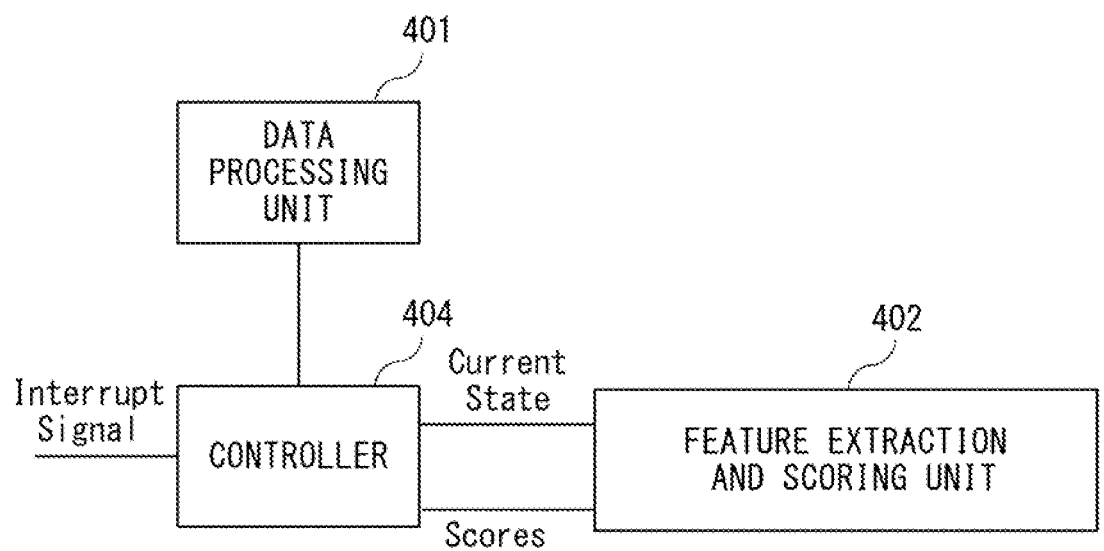
FIG. 6B is a block diagram showing a portion the RU selection module related to the RU selection phase.

Hereinafter, the operations of the RU selection module 122 will be explained. Firstly, the operation of the RU selection phase is explained. FIG. 6A shows the operation of the RU selection phase, and FIG. 6B shows a portion the RU selection module related to the RU selection phase. The RU selection phase is initiated upon receiving the interrupt signal from the MAC layer module 124 sent at Step A6 in FIG. 5. The controller 404 of the RU selection module 122 stores the device state information generated by the data processing unit 401 in the most recent data transmission as current device state information.

The controller 404 receives the interrupt from the MAC layer module 124 (Step B1). The controller 404 transmits current device state information to the feature extraction and scoring unit 402. The device state information is an N×M array where N is the number of the available RU and M is a system hyper-parameter. The current device state information includes information relating to channel activity in each RU in past M transmissions by the STA 102. The construction of the device state information is described later. Hereafter, the current device state information may be referred to as current state for the sake of simplicity, unless mentioned otherwise. The feature extraction and scoring unit 402 extracts features from the current state (Step B2) and generates scores for each available RU using Convolutional Neural Networks (CNNs) (Step B3).

Figure 7:
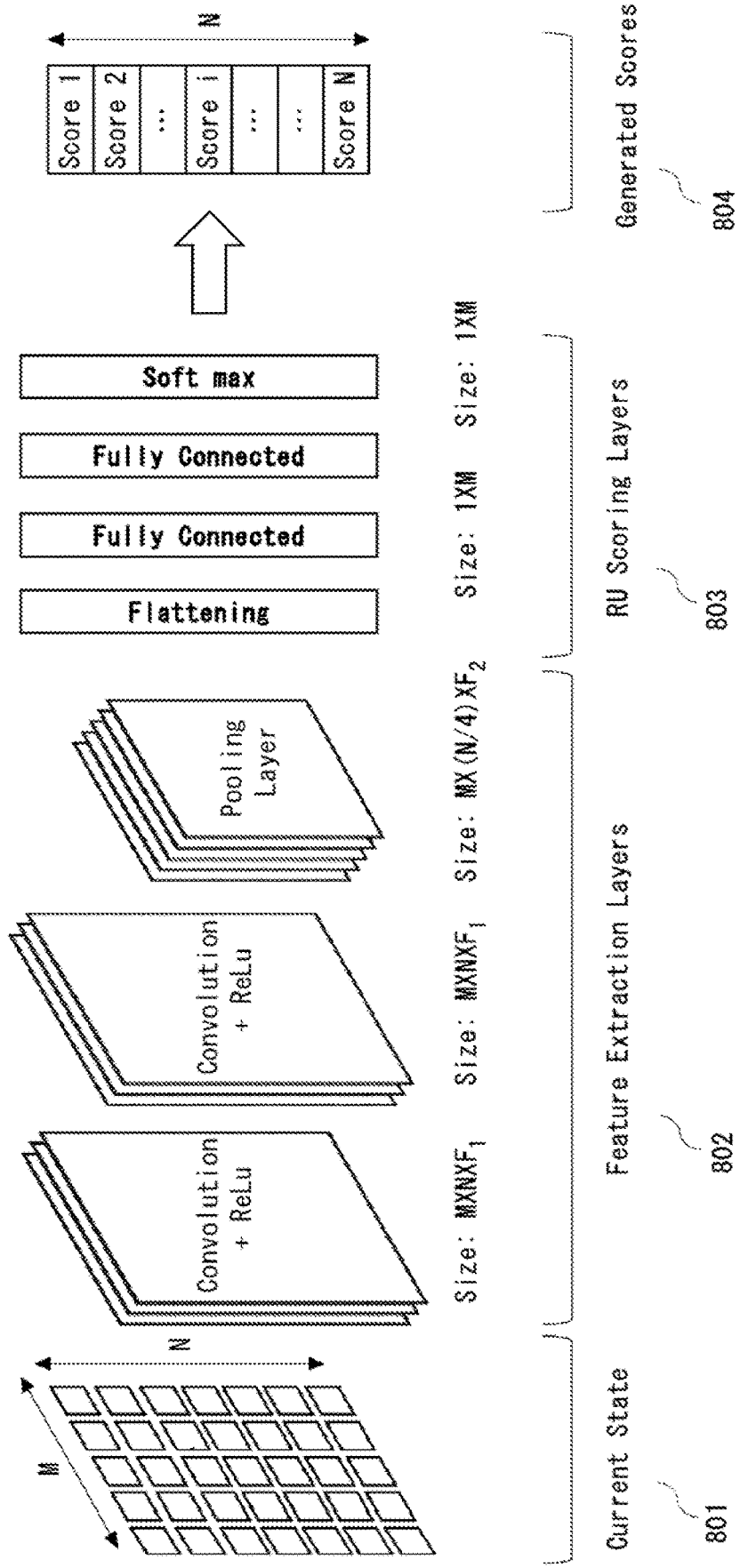
FIG. 7 is a diagram schematically illustrating extraction of features and generation of scores in the feature extraction and scoring unit.

FIG. 7 schematically illustrates extraction of features and generation of scores in the feature extraction and scoring unit 402. The CNNs used in the feature extraction and scoring unit 402 include feature extraction layers 802 and RU scoring layers 803. The feature extraction layers include one or more convolutional layers comprehending the interaction of the STA with other STAs in the wireless communication channel. The feature extraction layers 802 extracts features from the current state 801. The extracted features are representative of the interactions of the STA with other STAs in the wireless communication channel. The RU scoring layers include fully connected layers. The RU scoring layers 803 generates scores 804 for each RU based on the extracted features. The scores indicate the possibility of successful transmission.

The scores generated at Step B3 are transmitted back to the controller 404. The controller 404 selects the RU as per ε-greedy policy (Step B4). At Step B4, the controller selects a RU with the highest score with probability (1−ε). The controller 404 randomly selects any RU with F probability. The F is a system hyper-parameter whose value is selected based on the mobility of the STA. The value of F is greater than 0 and less than 1. The controller 404 transmits the index of the selected RU back to MAC layer module 124 (Step B5). The controller 404 stores the value of this RU. The STA 102 transmits a packet in the selected RU at Step A7 in FIG. 5. Based on the success or failure of transmission, the STA 102 receives the ACK signal from the AP 101.

Figure 8A:
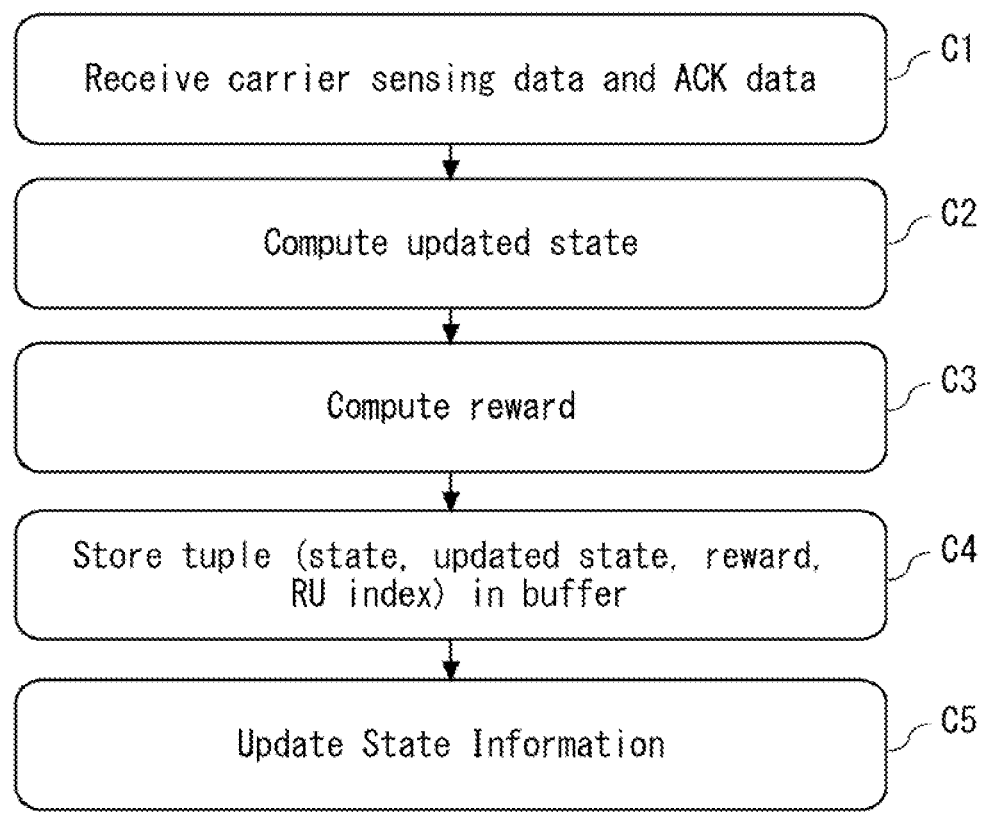
FIG. 8A is a flow chart showing the operation of the experience storage phase.
Figure 8B:
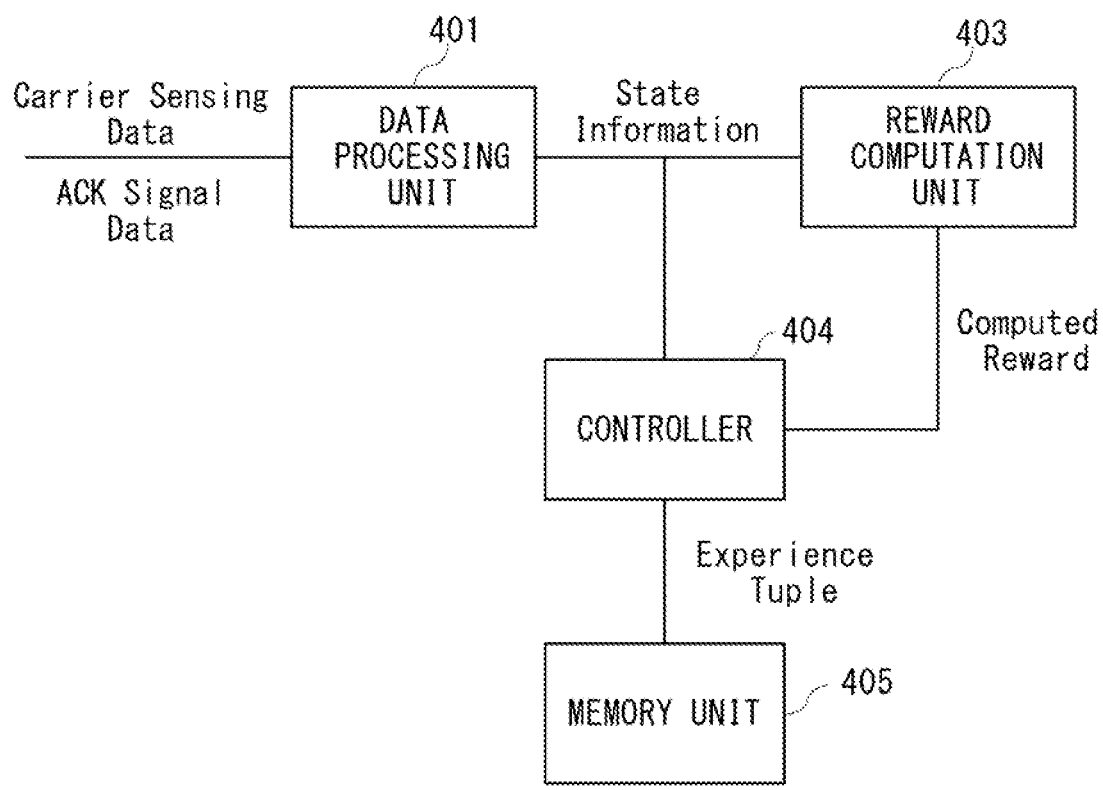
FIG. 8B is a block diagram showing a portion the RU selection module related to the experience storage phase.

Next, the experience storage phase is explained. The experience storage phase includes aggregating and storing experiences of the STA. FIG. 8A shows the operation of the experience storage phase. FIG. 8B shows a portion the RU selection module related to the experience storage phase. The experience storage phase is initiated when the carrier sensing data and ACK signal information are received from the PHY layer module 123.

In the RU selection module 122, the data processing unit 401 receives the carrier sensing data and ACK signal information from the PHY layer module 123 (Step C1). The data processing unit 401 computes the next state of the STA based on the received carrier sensing data and the ACK signal (Step C2). In other word, the data processing unit 401 computes the updated state based on the received carrier sensing data and the ACK signal.

Figure 9:
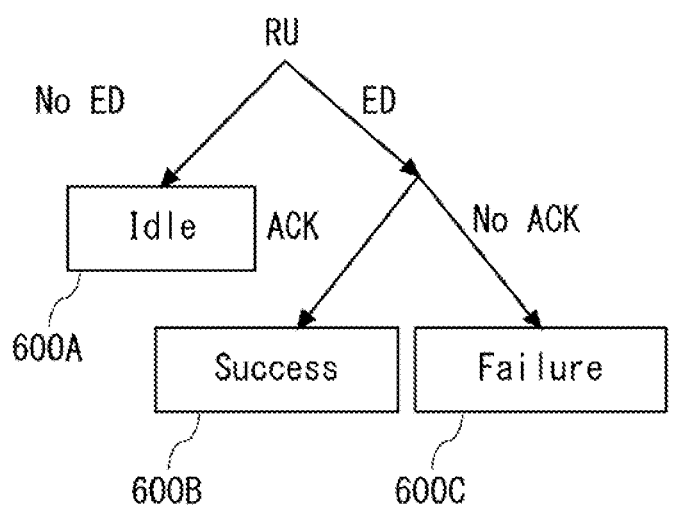
FIG. 9 is a diagram schematically illustrating classification of the RU.

In Step C2, the data processing unit 401 classified status (channel activity) of each RU as 'Success', 'Failure', or 'Idle' using the carrier sensing data and the ACK signal. FIG. 9 schematically illustrates classification of the RU. The carrier sensing data is considered to energy detection in each RU independently. The data processing unit 401 classifies a RU as Idle 600A if no energy was detected in that RU. The data processing unit 401 classifies a RU as Success 600B when energy was detected in that RU and the ACK signal indicates that the transmission on that RU is success. The data processing unit 401 classifies a RU as Failure 600C when energy was detected in that RU but the ACK signal is not received from the AP 101.

Figure 10A:
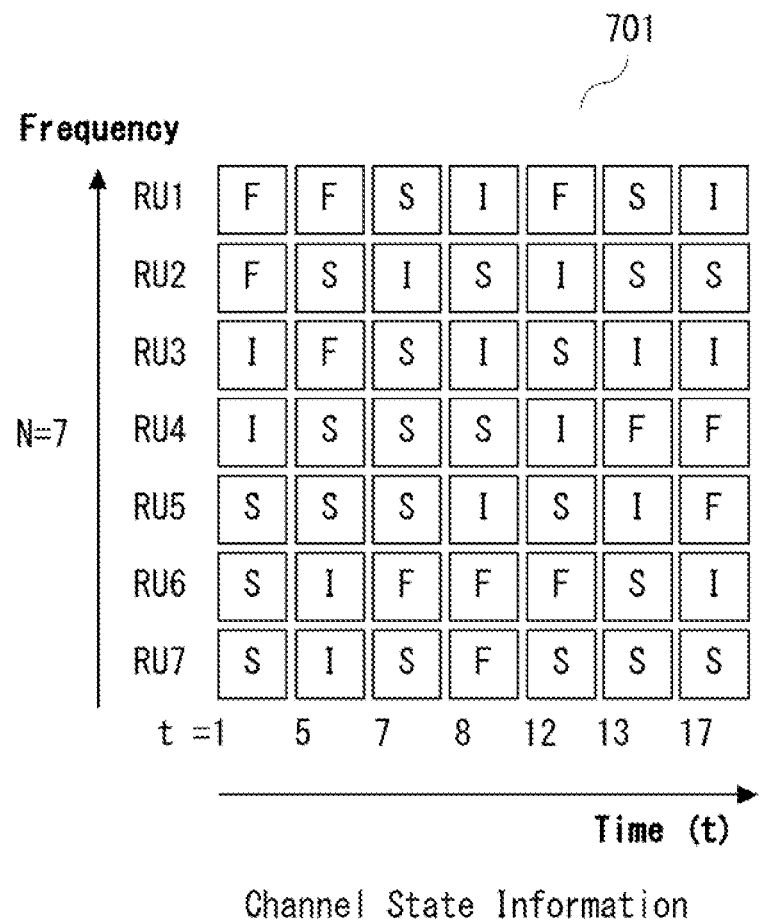
FIG. 10A is a diagram showing an example of the channel state information.

The data processing unit 401 aggregates the result of the classification of RUs. The aggregate of classified RUs in all of the previous transmissions is said to be channel state information. FIG. 10A shows an example of the channel state information. In FIG. 10A, the number of available RUs (N) equals to 7. It is assumed that the STA transmit data at time points t=1, 5, 7, 8, 12, 13, and 17. For example, at t=1, the RUT and RU2 are classified as Failure, the RU3 and RU4 are classified as Idle, and the RU5 to RU7 are classified as Success.

Figure 10B:
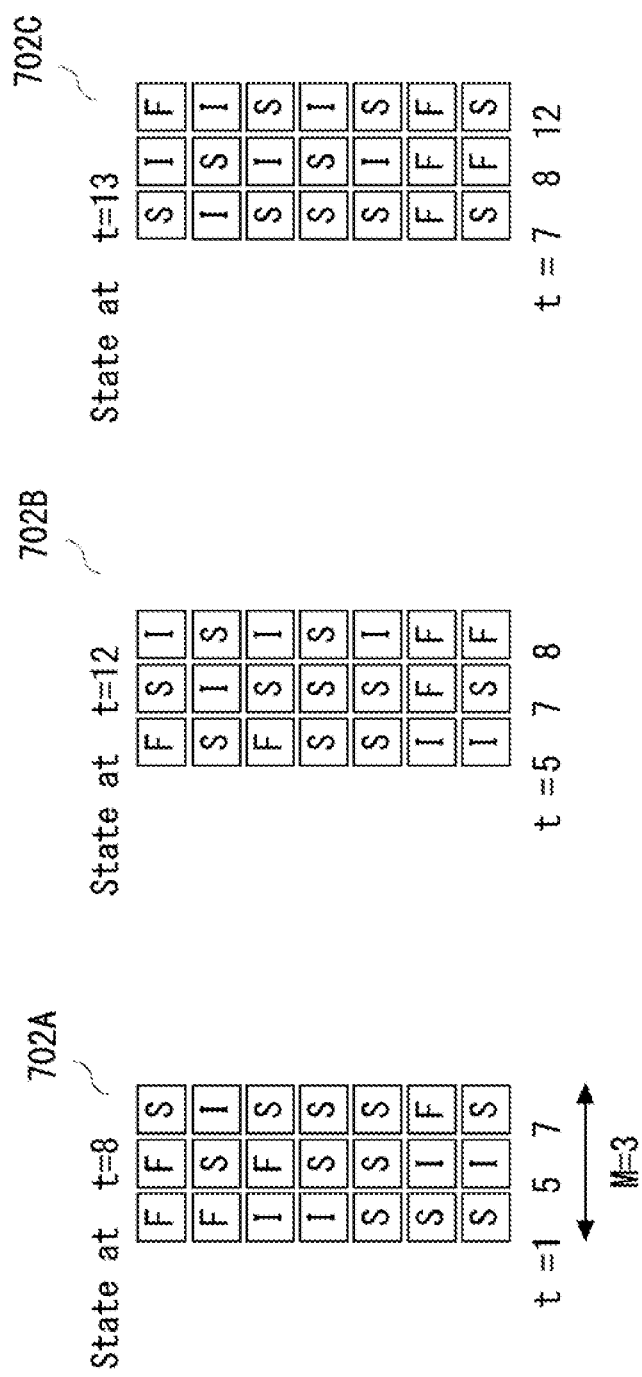
FIG. 10B is a diagram showing an example of the device state information with M=3 at different instances of time.

The device state information at any time point is the subset of the channel state information considering only M number of the recent transmissions. FIG. 10B shows an example of the device state information with M=3 at different instances of time. In FIG. 10B, the device state information 702A is device state information at t=8, the device state information 702B is device state information at t=12, and the device state information 702A is device state information at t=13.

The data processing unit 401 updates the device state information by getting rid of the most left (the oldest) column of the M×N array and adding a new column at the most right column for each time the STA transmits data. It should be noted that no transmission took place between t=9 to t=12 (referring to FIG. 10A). It is assumed that device state information at t=9 to t=11 is the same as the device state information at t=12.

Referring back to FIGS. 8A and 8B, the data processing unit 401 transmit the updated device state information to the reward computation unit 403 and controller 404. The reward computation unit 403 rewards the device based on the updated device state information (Step C3). In Step C3, the reward computation unit 403 computes reward based on the total number of the RU classified as Success, the total number of the RU classified as Failures and the total number of the RU classified as Idle in the updated device state information. For example, the reward computing unit 403 assigns +1 for each Success, −1 for each Failure, and 0 to each Idle in the device state information. The total reward is considered to be the sum of attributed values for all RUs in the M×N array.

The controller 404 obtains the device state information from the data processing unit 401 and the computed reward from the reward computation unit 403. The Controller 404 compiles previously stored (current) device state information, the stored RU index, the updated device state information obtained from the data processing unit 401 and the computed reward into a tuple. In the following description, the tuple may be referred as 'experience'. The controller 404 stores the experience into the memory unit 405 with fixed capacity (Step C4). On reaching the capacity, the memory unit 405 deletes the oldest experience of the STA. The controller 404 updates the stored device state information with the new device state information (Step C5).

Figure 11A:
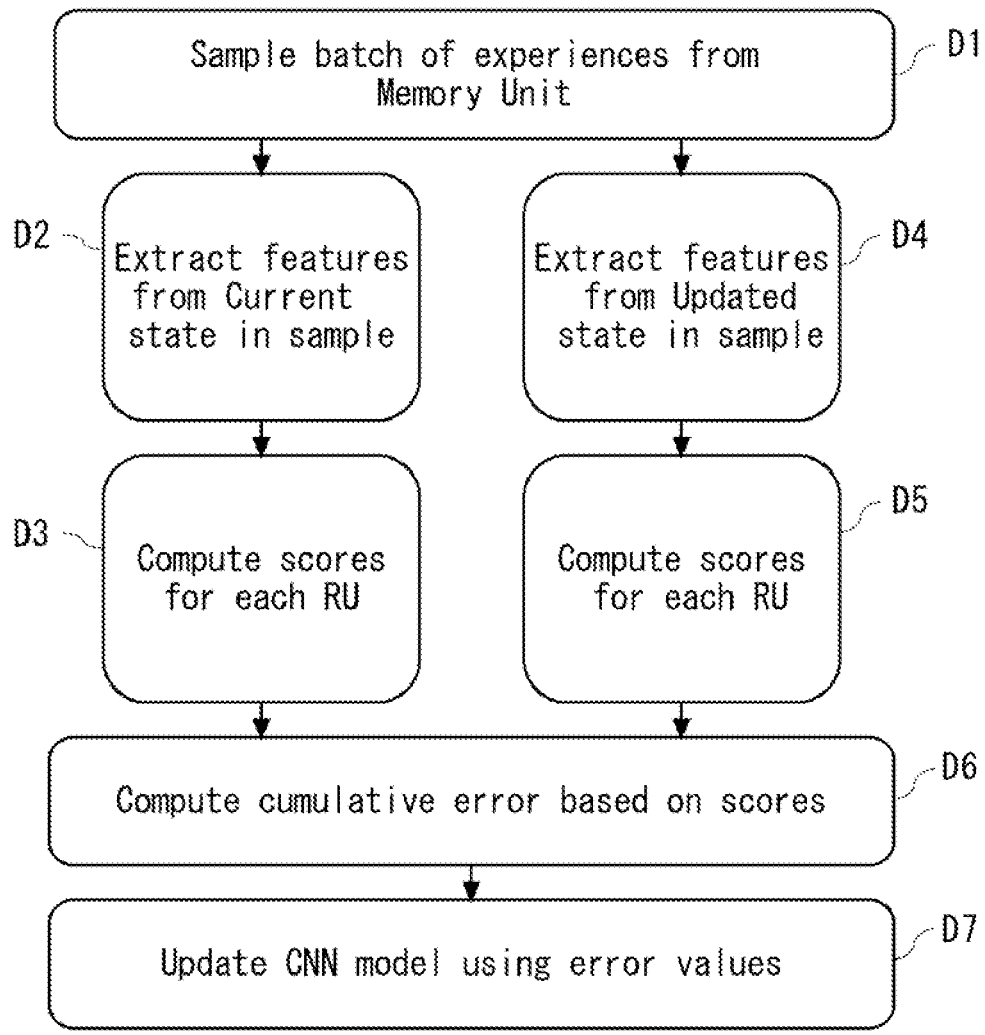
FIG. 11A is a flowchart showing the operation of the update phase.
Figure 11B:
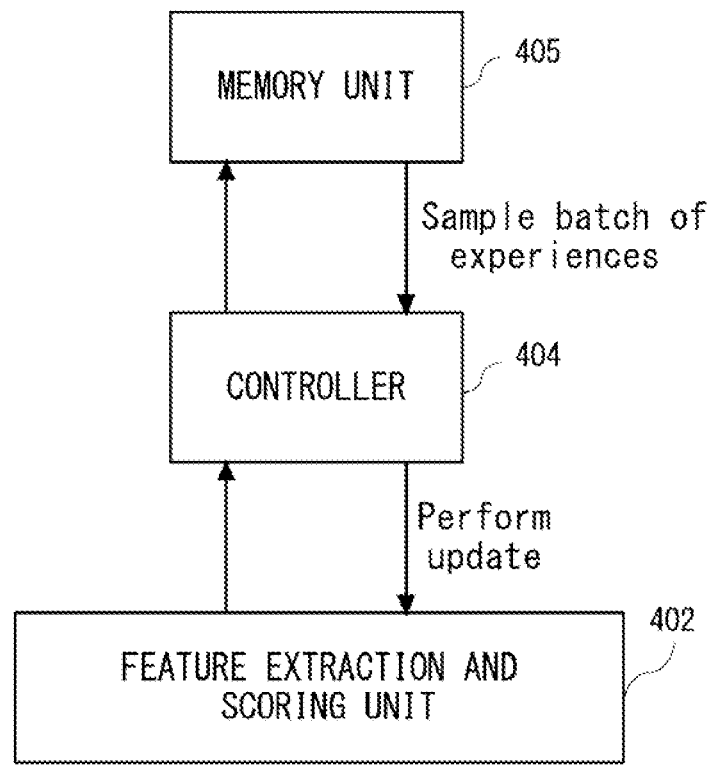
FIG. 11B is a block diagram showing a portion the RU selection module related to the update phase.

Further, the update phase is explained. The update phase includes periodically updating the CNNs based on accumulated experiences. FIG. 11A shows the operation of the update phase, and FIG. 11B shows a portion the RU selection module related to the update phase. For example, the updated phase is initiated by the controller 404 each time after the STA transmits data for a predetermined number of times.

In the update phase, the controller 404 randomly samples a batch of the experiences from the memory unit 405 (Step D1). The features extraction and scoring unit 402 extracts features from the current device state information in each experience within the sample batch (Step D2). The features extraction and scoring unit 402 computes scores for each RU based on the features extracted from the current device state information (Step D3). The features extraction and scoring unit 402 extracts features from the updated device state information in each experience within the sample batch (Step D4). The features extraction and scoring unit 402 computes scores for each RU based on the features extracted from the updated device information (Step D5).

The controller 404 computes a cumulate error as difference between scores obtained from the current device state information and the updated device state information in all sampled experiences (Step D6). The controller 404 updates the CNN model in the feature extraction and scoring unit 402 based on the computed cumulative error and rewards complied in each experience using stochastic gradient descent (Step D7).

The inventor conducted a simulation in order to confirm the effect of the present embodiment. In the simulation, a network with a single AP and multiple stations is assumed. Further, the simulation assumes that all stations are data back-logged, i.e. always have data to transmit. The simulations are performed for uplink data.

Communication network parameters in the simulation are shown below.

Number of stations [1,50]
Available RUs=9
OFDMA frame duration=120 μs
SIFS (Short Inter Frame Space)=10 μs
DIFS (DCF (Distributed Coordination Function) Inter Frame Space)=28 μs
Packet size=100 bytes
ACK size=32 bytes
Trigger frame size=32 bytes
OFDMA data rate=6.7 mbps
CSMA/CA data rate=52 mbps Deep reinforcement learning parameters used for updating the CNNs are shown below.

Learning Rate=0.01
Discount factor=0.9
Epsilon=0.1
Batch Size=32
Experience Replay Buffer size=500
Channel History=20
DDQN (Double Deep Q Network) update frequency=16

Figure 12:
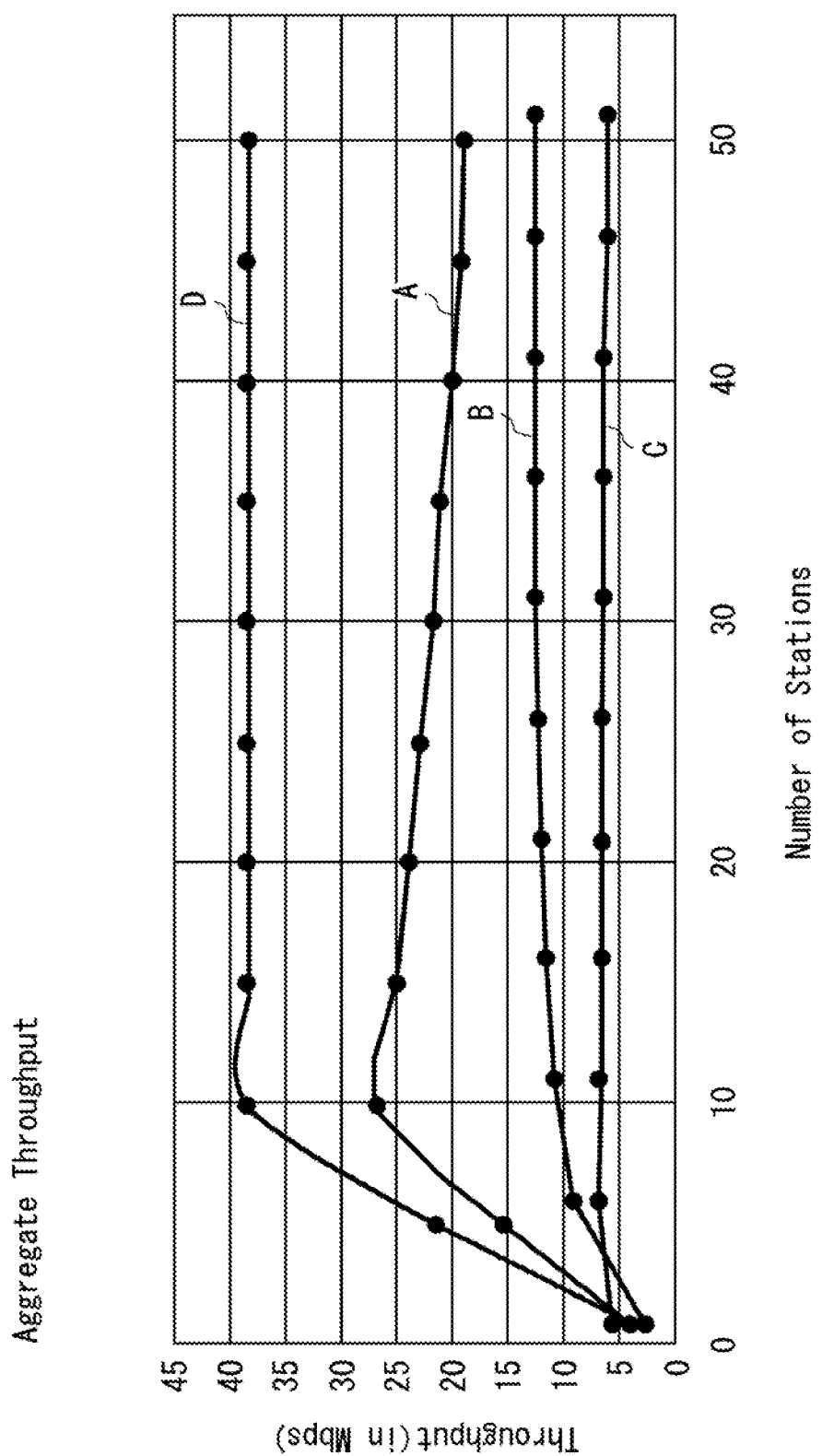
FIG. 12 is a graph showing the variation of average throughput per station with total number of active stations.
Figure 13:
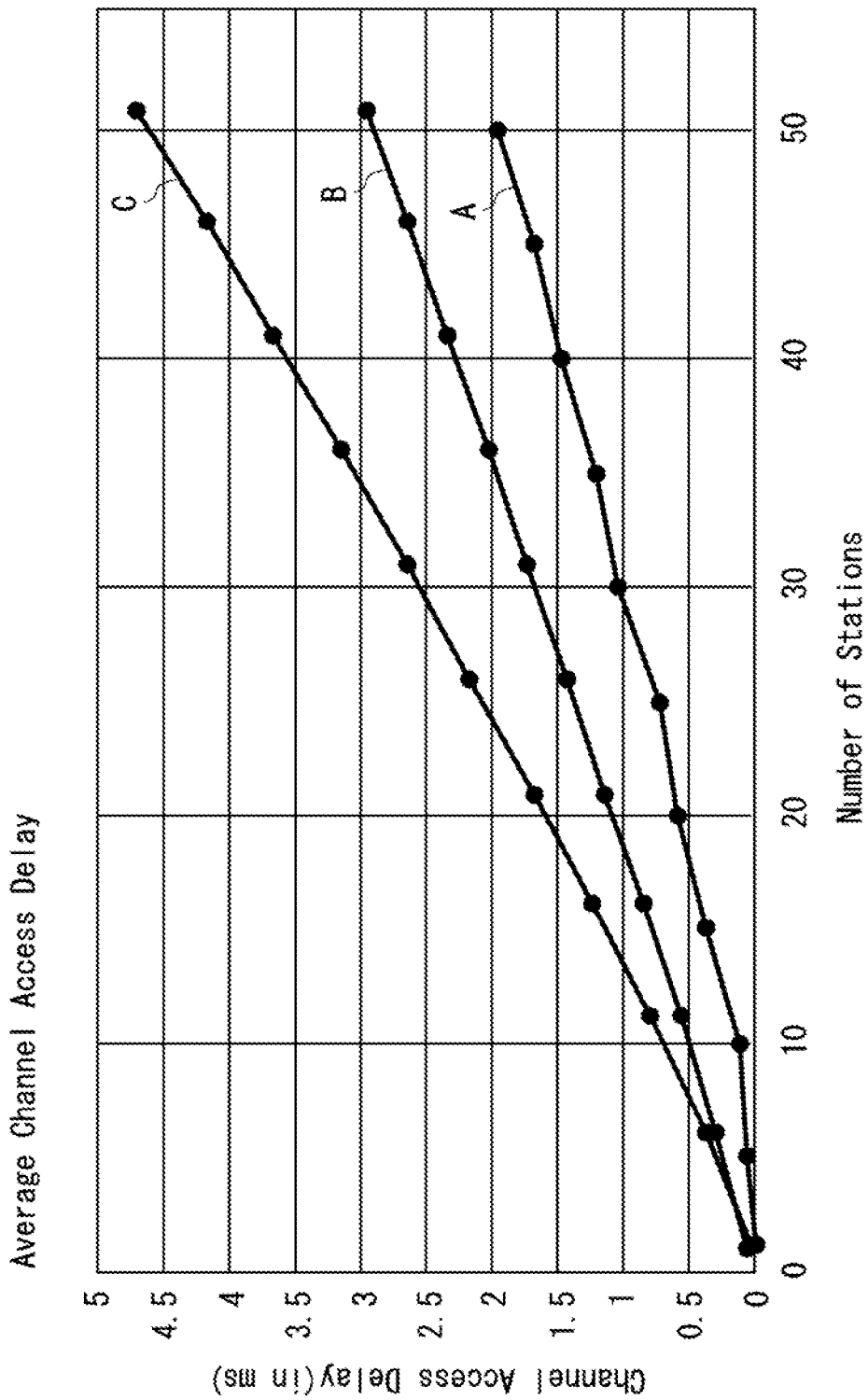
FIG. 13 is a graph showing the variation of average channel access delay per station with total number of active stations.
Figure 14:
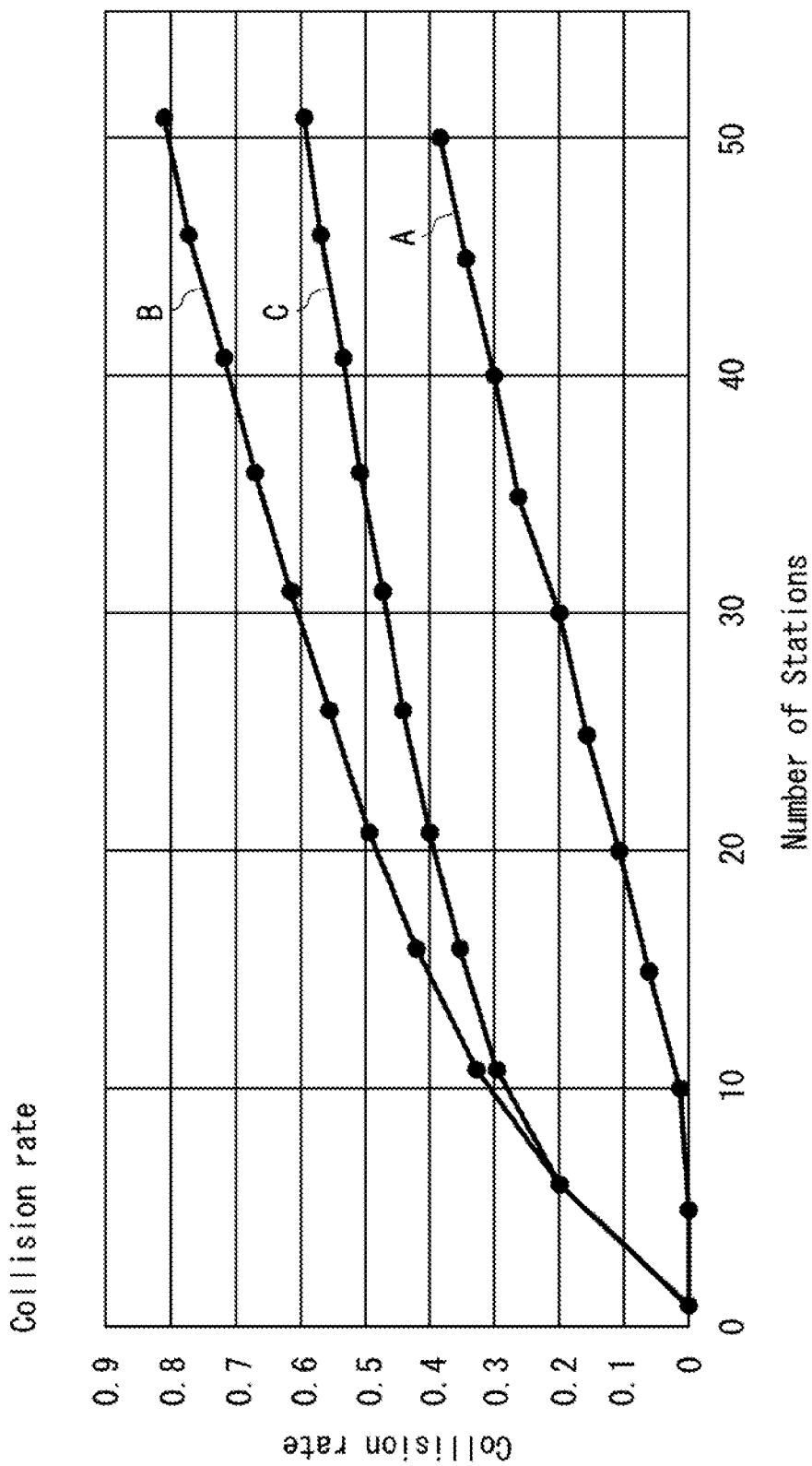
FIG. 14 is a graph showing the variation of collision rate per station with total number of active stations.

FIGS. 12 to 14 shows the result of the simulation. FIG. 12 shows the variation of average throughput per station with total number of active stations. In FIG. 12, the graph A represents the present embodiment, graph B represents ODFMA, graph C represents CSMA/CA, and graph D represents the theoretical maximum. The throughput is defined by below equation.

Throughput=Total Data Transmission/Total Time taken

As can be seen, the present embodiment achieves 3 times higher throughput than CSMA/CA.

FIG. 13 shows the variation of average channel access delay per station with total number of active stations. In FIG. 13, the graph A represents the present embodiment, graph B represents ODFMA, and graph C represents CSMA/CA. The channel access delay is defined as time duration between data arrives in send buffer of STA to when it actually gets transmitted successfully. As can be seen, the present embodiment achieves 62% lower channel access delay than CSMA/CA.

FIG. 14 shows the variation of collision rate per station with total number of active stations. In FIG. 14, the graph A represents the present embodiment, graph B represents ODFMA, and graph C represents CSMA/CA. The collision rate is defined by below equation.

Collision Rate=Number of collision packets/Number of successful packets

As can be seen, the present embodiment achieves 57% lower collision rate than that in CSMA/CA.

The present embodiment is applicable to a wireless communication system in an environment where wireless network monitoring is possible in the regions controlled by access points. The present embodiment can be used to improve overall channel utilization leading higher overall throughput. Further, the present embodiment provides means for STAs to dynamically adapt to changing wireless networks autonomously. Furthermore, the present embodiment ensures compatibility with standard 802.11 stations with fair medium access opportunity for everyone.

Figure 15:
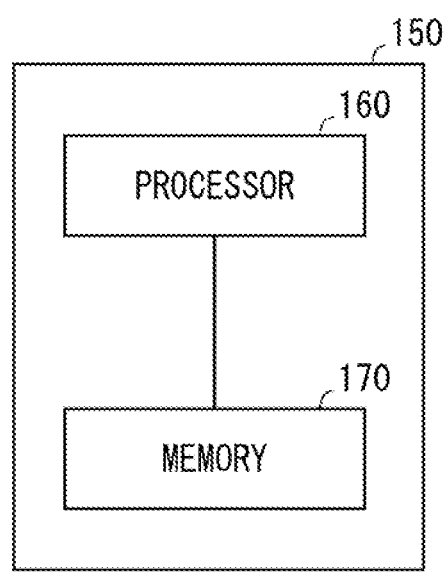
FIG. 15 is a block diagram showing an example of a configuration of a device.

It should be noted that, in the above embodiment, the RU selection module 122 can be implemented by a device having one or more processor. FIG. 15 shows an example of a configuration of a device. A computer device 150 includes a processor 160 and a memory 170. The memory 170 includes a volatile memory and/or a non-volatile memory. The memory 170 stores a software (program) to be executed on the processor 160, for example, in the non-volatile memory. The processor 160 is, for example, a Central Processing Unit (CPU) or the like. The functions of the data processing unit 401, the feature extraction and scoring unit 402, the reward computation unit 403, and the controller 404 may be implemented by the processor 160 operating in accordance with the program loaded from the memory 170. The processor 160 may load the program from an external memory of the device 110.

The above program can be stored and provided to the device 150 using any type of non-transitory computer readable medium. Non-transitory computer readable medium include any type of tangible storage medium. Examples of non-transitory computer readable medium include magnetic storage medium (such as floppy disks, magnetic tapes, hard disk drives, etc.), optical magnetic storage medium (e.g. magneto-optical disks), optical disk storage medium (such as CD (compact disc), DVD (digital versatile disk)), and semiconductor memories (such as mask ROM, PROM (programmable ROM), EPROM (erasable PROM), flash ROM, RAM, etc.). The program may be provided to a computer device 300 using any type of transitory computer readable medium. Examples of transitory computer readable medium include electric signals, optical signals, and electromagnetic waves. Transitory computer readable medium can provide the program to a computer via a wired communication line (e.g. electric wires, and optical fibers) or a wireless communication line.

Although the present disclosure has been described with reference to the embodiments, the present disclosure is not limited to above. Various changes that can be understood by those skilled in the art within the scope of the present disclosure can be made to the configurations and details of the present disclosure.

For example, the whole or some of the embodiments disclosed above can be described as, but not limited to, the following supplementary notes.

(Supplementary Note 1)

A wireless communication device, comprising:
  a physical layer module configured to generate carrier sensing data indicating whether or not energy is detected in each resource unit, RU, used in wireless communication between the wireless communication device and an access point, and receive acknowledgement signals from the access point;
  a RU selection module, configured to determine a RU used to transmit data from the wireless communication device to the access point; and
  a media access control layer module configured to transmit data using the RU determined by the RU selection module,
  wherein the RU selection module comprising:
    a data processing unit configured to generate device state information based on the carrier sensing data and the acknowledgement signals obtained from the physical layer module;
    a feature extraction and scoring unit configured to extract features from the device state information representative of interactions of a wireless communication station with other wireless communication stations, and generate scores for each RU representative of possibility of successful transmission based on the extracted features;
    a reward computation unit configured to compute reward for providing feedback on prediction accuracy of the scores generated by the feature extraction and scoring unit;
    a controller configured to determine the RU used to transmit data based on the scores generated by the feature extraction and scoring unit, store experiences including the device state information and the reward in a memory unit, and update parameters of the feature extraction and scoring unit based on the experiences stored in the memory unit.

(Supplementary Note 2)

The wireless communication device according to Supplementary note 1, wherein the RU is an orthogonal frequency division multiple access, OFDMA, sub-channel.

(Supplementary Note 3)

The wireless communication device according to Supplementary note 1 or 2, wherein the carrier sensing data indicates result of independent energy detection in each of available RUs and the acknowledgement signals are transmitted by the access point in an end of each multi-user uplink data transmission.

(Supplementary Note 4)

The wireless communication device according to any one of Supplementary notes 1 to 3, wherein the experience includes the ensemble of the device state information, an index of RU in which packet is transmitted, updated device state information post packet transmission and the reward.

(Supplementary Note 5)

The wireless communication device according to any one of Supplementary notes 1 to 4, wherein the data processing unit classifies status of each RU as success, failure or idle and generates the device state information based on the classified status of available RUs in a predetermined number of past data transmission of the wireless communication device.

(Supplementary Note 6)

The wireless communication device according to Supplementary note 5, wherein the reward computation unit computes the reward representative of the performance of the feature extraction and scoring unit based on total number of the RU classified as success, total number of the RU classified as failures and total number of the RU classified as idle in the device state information generated by the data processing unit after data transmission.

(Supplementary Note 7)

The wireless communication device according to any one of Supplementary notes 1 to 6, wherein the feature extraction and scoring unit uses a convolutional neural network, CNN, to extract the features and generate the scores.

(Supplementary Note 8)

The wireless communication device according to Supplementary note 7, wherein the CNN includes one or more convolutional layers comprehending the interaction of the wireless communication device with other wireless communication device in the wireless communication channel, and the feature extraction and scoring unit extracts features using the one or more convolutional layers.

(Supplementary Note 9)

The wireless communication device according to Supplementary note 7 or 8, wherein the CNN includes fully connected layers, and the feature extraction and scoring unit generates scores using the fully connected layers.

(Supplementary Note 10)

The wireless communication device according to any one of Supplementary notes 1 to 9, wherein the experiences of the wireless communication device in its past predetermined number of data transmission are stored in the memory unit.

(Supplementary Note 11)

The wireless communication device according to any one of Supplementary notes 1 to 10, wherein the memory unit is a fixed size buffer, and when the buffer reaches its capacity, the oldest experience is deleted to accommodate the new experience.

(Supplementary Note 12)

The wireless communication device according any one of Supplementary notes 1 to 11, wherein the MAC layer module sends an interrupt signal to the controller when the wireless communication device has data to transmit, and the controller initiates RU selection when the interrupt signal is received.

(Supplementary Note 13)

The wireless communication device according to any one of Supplementary notes 1 to 12, the controller selects a RU used to transmit data as per 8-greedy policy.

(Supplementary Note 14)

The wireless communication device according to any one of Supplementary notes 1 to 13, wherein the controller samples batches of experiences from the memory unit to compute the error between estimated scores and actual scores and updates the parameters of the feature extraction and scoring unit based on the computed error.

(Supplementary Note 15)

A resource unit, RU, selection device used in a wireless communication device, comprising:
  a data processing unit configured to generate device state information based on carrier sensing data indicating whether or not energy is detected in each RU used in wireless communication between the wireless communication device and an access point and acknowledgement signals received from the access point;
  a feature extraction and scoring unit configured to extract features from the device state information representative of interactions of a wireless communication station with other wireless communication stations, and generate scores for each RU representative of possibility of successful transmission based on the extracted features;
  a reward computation unit configured to compute reward for providing feedback on prediction accuracy of the scores generated by the feature extraction and scoring unit;
  a controller configured to determine a RU used to transmit data based on the scores generated by the feature extraction and scoring unit, store experiences including the device state information and the reward in a memory unit and update parameters of the feature extraction and scoring unit based on the experiences stored in the memory unit.

(Supplementary Note 16)

The RU selection device according to Supplementary note 15, wherein the RU is an orthogonal frequency division multiple access, OFDMA, sub-channel.

(Supplementary Note 17)

The RU selection device according to Supplementary note 15 or 16, wherein the carrier sensing data indicates result of independent energy detection in each of available RUs and the acknowledgement signals are transmitted by the access point in an end of each multi-user uplink data transmission.

(Supplementary Note 18)

A resource unit, RU, selection method in a wireless communication device, comprising:
  generating device state information based on carrier sensing data indicating whether or not energy is detected in each RU used in wireless communication between the wireless communication device and an access point and acknowledgement signals received from the access point;
  extracting features from the device state information representative of interactions of a wireless communication station with other wireless communication stations,
  generating scores for each RU representative of possibility of successful transmission based on the extracted features;
  computing reward for providing feedback on prediction accuracy of the scores; determining a RU used to transmit data based on the generated scores storing experiences including the device state information and the reward in a memory unit; and
  updating parameters used to extract the features and generate the scores based on the experiences stored in the memory unit.

(Supplementary Note 19)

A non-transitory computer readable medium having stored thereon a program to be executed by a processor, the program causing the processor to execute:
  generating device state information based on carrier sensing data indicating whether or not energy is detected in each RU used in wireless communication between the wireless communication device and an access point and acknowledgement signals received from the access point;
  extracting features from the device state information representative of interactions of a wireless communication station with other wireless communication stations,
  generating scores for each RU representative of possibility of successful transmission based on the extracted features;
  computing reward for providing feedback on prediction accuracy of the scores; determining a RU used to transmit data based on the generated scores storing experiences including the device state information and the reward in a memory unit; and
  updating parameters used to extract the features and generate the scores based on the experiences stored in the memory unit.

REFERENCE SIGNS LIST

101 AP
102 STA

121 ANTENNA
122 RU SELECTION MODULE
123 PHY LAYER MODULE
124 MAC LAYER MODULE
125 APPLICATION MODULE
401 DATA PROCESSING UNIT
402 FEATURE EXTRACTION AND SCORING UNIT
403 REWARD COMPUTATION UNIT
404 CONTROLLER
405 MEMORY UNIT

What is claimed is:

1. A wireless communication device comprising:
a resource unit (RU) selection module, configured to determine an RU used to transmit data from the wireless communication device to an access point;
wherein the RU selection module comprises:
at least one memory storing instructions; and
at least one processor configured to execute the instructions to:
generate device state information based on carrier sensing data indicating whether or not energy is detected in each RU used in wireless communication between the wireless communication device and an access point and acknowledgement signals received from the access point;
apply the device state information to a convolutional neural network (CNN) including one or more convolutional layers extracting features representative of an interference between the wireless communication device and other wireless communication device in a wireless communication channel and fully connected layers to extract features from the device state information representative of interactions of a wireless communication station with other wireless communication stations, and to generate scores for each RU representative of possibility of successful transmission based on the extracted features;
compute a reward for providing feedback on prediction accuracy of the generated scores;
determine an RU used to transmit data based on the generated scores;
store experiences including a set of the device state information, an index of RU in which packet is transmitted, updated device state information post packet transmission, and the reward in a memory unit;
sample batches of experiences from the memory unit;
compute a first score for each RU by applying the device state information included in the sampled batch to the CNN;
compute a second score for each RU by applying the updated device state information to the CNN;
compute a difference between the first score and the second score as an error; and
update the CNN based on the computed error.

2. The wireless communication device according to claim 1, wherein the RU is an orthogonal frequency division multiple access, OFDMA, sub-channel.

3. The wireless communication device according to claim 1, wherein the carrier sensing data indicates result of independent energy detection in each of available RUs and the acknowledgement signals are transmitted by the access point in an end of each multi-user uplink data transmission.

4. The wireless communication device according to claim 1, wherein the at least one processor is configured to execute the instructions to classify status of each RU as success, failure or idle and generates the device state information based on the classified status of available RUs in a predetermined number of past data transmission of the wireless communication device.

5. The wireless communication device according to claim 4, wherein the at least one processor is configured to execute the instructions to compute the reward representative of performance of the feature extraction and scoring based on total number of the RU classified as success, total number of the RU classified as failures and total number of the RU classified as idle in the device state information generated after data transmission.

6. The wireless communication device according to claim 1, wherein the memory unit stores experiences for a predetermined number of data transmission in the wireless communication device.

7. The wireless communication device according to claim 1, wherein the memory unit is a fixed size buffer, and when the buffer reaches its capacity, an oldest experience is deleted to accommodate a new experience.

8. The wireless communication device according to claim 1, wherein the RU selection module receives an interrupt signal when the wireless communication device has data to transmit, and the at least one processor is configured to execute the instructions to initiate RU selection when the interrupt signal is received.

9. The wireless communication device according to claim 1, wherein the at least one processor is configured to execute the instructions to select, as an RU used to transmit data, an RU having a highest score with probability $(1-\varepsilon)$ and any RU with probability $\varepsilon$, where $0<\varepsilon<1$.

10. A resource unit (RU), selection device used in a wireless communication device, comprising:
at least one memory storing instructions; and
at least one processor configured to execute the instructions to:
generate device state information based on carrier sensing data indicating whether or not energy is detected in each RU used in wireless communication between the wireless communication device and an access point and acknowledgement signals received from the access point;
apply the device state information to a convolutional neural network (CNN) including one or more convolutional layers extracting features representative of an interference between the wireless communication device and other wireless communication device in a wireless communication channel and fully connected layers to extract features from the device state information representative of interactions of a wireless communication station with other wireless communication stations, and generate scores for each RU representative of possibility of successful transmission based on the extracted features;
compute a reward for providing feedback on prediction accuracy of the generated scores;
determine an RU used to transmit data based on the generated scores;
store experiences including a set of the device state information, an index of RU in which packet is transmitted, updated device state information post packet transmission, and the reward in a memory unit;
sample batches of experiences from the memory unit;
compute a first score for each RU by applying the device state information included in the sampled batch to the CNN;

compute a second score for each RU by applying the updated device state information to the CNN;

compute a difference between the first score and the second score as an error; and update the CNN based on the computed error.

11. The RU selection device according to claim 10, wherein the RU is an orthogonal frequency division multiple access, OFDMA, sub-channel.

12. The RU selection device according to claim 10, wherein the carrier sensing data indicates result of independent energy detection in each of available RUs and the acknowledgement signals are transmitted by the access point in an end of each multi-user uplink data transmission.

13. A resource unit (RU) selection method in a wireless communication device, comprising:

generating device state information based on carrier sensing data indicating whether or not energy is detected in each RU used in wireless communication between the wireless communication device and an access point and acknowledgement signals received from the access point;

apply the device state information to a convolutional neural network (CNN) including one or more convolutional layers extracting features representative of an interference between the wireless communication device and other wireless communication device in a wireless communication channel and fully connected layers to extract features from the device state information representative of interactions of a wireless communication station with other wireless communication stations, generating scores for each RU representative of possibility of successful transmission based on the extracted features;

computing a reward for providing feedback on prediction accuracy of the generated scores;

determining an RU used to transmit data based on the generated scores;

storing experiences including a set of the device state information, an index of RU in which packet is transmitted, updated device state information post packet transmission, and the reward in a memory unit;

sampling batches of experiences from the memory unit;

computing a first score for each RU by applying the device state information included in the sampled batch to the CNN;

computing a second score for each RU by applying the updated device state information to the CNN;

computing a difference between the first score and the second score as an error; and updating the CNN based on the computed error.

\* \* \* \* \*